US008823761B2

(12) United States Patent
Yoshida (10) Patent No.: US 8,823,761 B2
(45) Date of Patent: Sep. 2, 2014

(54) OPTICAL SCANNING DEVICE AND IMAGE FORMING APPARATUS (75) Inventor: Shingo Yoshida, Osaka (JP)

(73) Assignee: Kyocera Mita Corporation (JP)

(*) Notice: Subject to any disclaimer, the term of this patent is extended or adjusted under 35 U.S.C. 154(b) by 134 days.

(21) Appl. No.: 13/291,336

(22) Filed: Nov. 8, 2011

(65) Prior Publication Data
US 2012/0133726 A1 May 31, 2012

(30) Foreign Application Priority Data

Nov. 30, 2010 (JP) ................................ 2010-266805

(51) Int. Cl.
B41J 2/47 (2006.01)
B41J 15/14 (2006.01)
B41J 27/00 (2006.01)
B41J 2/435 (2006.01)
H04N 1/113 (2006.01)
G02B 26/12 (2006.01)
G06K 15/12 (2006.01)
H04N 1/047 (2006.01)

(52) U.S. Cl.
CPC ............... B41J 2/471 (2013.01); H04N 1/113 (2013.01); G02B 26/127 (2013.01); G06K 15/1219 (2013.01); H04N 1/0476 (2013.01); G02B 26/125 (2013.01); H04N 2201/04729 (2013.01)
USPC .......... 347/235; 347/243; 347/250; 347/259; 347/261

(58) Field of Classification Search
USPC ........................... 347/235, 243, 250, 259, 261
See application file for complete search history.

(56) References Cited

U.S. PATENT DOCUMENTS

| 4,978,977 | A | 12/1990 | Ohmori et al. | |
|---|---|---|---|---|
| 6,362,470 | B1 | 3/2002 | Yoshida et al. | |
| 2002/0018112 | A1* | 2/2002 | Nishiguchi et al. | 347/259 |
| 2005/0184229 | A1* | 8/2005 | Maeda | 250/234 |
| 2007/0053011 | A1* | 3/2007 | Sobue | 358/474 |
| 2007/0097202 | A1 | 5/2007 | Shinohara | |
| 2008/0018970 | A1* | 1/2008 | Miyanagi et al. | 359/197 |

FOREIGN PATENT DOCUMENTS

JP 8-220457 8/1996
JP 2000-284194 10/2000

* cited by examiner

Primary Examiner — Justin Seo
Assistant Examiner — Kendrick Liu
(74) Attorney, Agent, or Firm — Gerald E. Hespos; Michael J. Porco; Matthew T. Hespos (57) ABSTRACT An optical scanning device includes a light source that emits a laser beam, a deflector that deflects the emitted laser beam, a scanning lens that causes the deflected laser beam to scan a surface of a photosensitive body at a uniform velocity, a reflector having a reflective surface that reflects the deflected laser beam toward the photosensitive body among the laser beams that have passed through the scanning lens, and a synchronization sensor that receives the laser beam from the reflector and outputs a detection signal. The reflector is set so that a scanning speed in a main scanning direction of the laser beam on a light-receiving surface of the synchronization sensor becomes greater than a value obtained by dividing a scanning distance of the laser beam in the main scanning direction on the light-receiving surface of the synchronization sensor by a response delay time of the synchronization sensor.

9 Claims, 6 Drawing Sheets

OPTICAL SCANNING DEVICE AND IMAGE FORMING APPARATUS

BACKGROUND OF THE INVENTION

1. Field of the Invention

The present invention relates to an optical scanning device which causes a laser beam to be deflected in a predetermined direction and scan a surface of a photosensitive body, and tan image forming apparatus using such an optical scanning device.

2. Description of the Related Art

In an optical scanning device that is used in laser printers and copiers, conventionally known is technology of causing a laser beam emitted from a light source to perform deflection and scanning based on the rotation of a polygon mirror, and determining the write start timing of writing on a photosensitive body based on a detection signal that is output from a BD (Beam Detect) sensor when a part of the laser beam is reflected by a folding mirror via an imaging lens and enters a light-receiving surface of the BD sensor.

For instance, with the conventional technology, attempts have been made for shortening the distance from the polygon mirror to the BD sensor and miniaturizing the device by disposing a cylindrical lens, which has power in the main scanning direction, immediately before the BD sensor.

Nevertheless, with the conventional technology, since the cylindrical lens is given the power to condense the laser beam in the main scanning direction, the scanning speed of the laser beam that enters the BD sensor becomes slow in comparison to the case of not going through the cylindrical lens, and the speed that the electric charge corresponding to the amount of light of the laser beam being accumulated in the BD sensor will also become slow.

Under circumstances where the rise of the BD sensor is slow as described above, if the amount of light of the laser beam changes due to the contamination of the reflective surface of the polygon mirror or the change in the amount of light caused by the laser beam source, the output timing of the detection signal that is output when an electric charge corresponding to the amount of light of the laser beam is accumulated in a predetermined amount in the BD sensor will also change, and there is a problem in that the write start timing of writing on the photosensitive body will fluctuate considerably.

The present invention was devised in view of the foregoing circumstances, and an object of this invention is to provide an optical scanning device and an image forming apparatus which are resistance to changes in the amount of light of the laser beam, and which can accurately obtain a synchronization signal for adjusting the write start timing of writing on the photosensitive body.

SUMMARY OF THE INVENTION

In order to achieve the foregoing object, the present invention relates to an optical scanning device and an image forming apparatus including such optical scanning device. This optical scanning device includes a light source unit (101) which emits a laser beam, a deflector (104) which reflects and deflects the laser beam emitted from the light source unit (101), a scanning lens (105a) which causes the laser beam deflected by the deflector (104) to scan a surface of a photosensitive body at a uniform velocity, a reflector (106) having, on its surface, a reflective surface which reflects the laser beam deflected toward the outside of the photosensitive body (14) among the laser beams that have passed through the scanning lens (105a), and a synchronization sensor (108) which receives the laser beam reflected by the reflector (106) and outputs a detection signal representing the reception of the laser beam. The reflector (106) is set so that a scanning speed (Vm) in a main scanning direction which is a scanning direction of the laser beam on a light-receiving surface, of the synchronization sensor (108), where the laser beam reflected by the reflective surface is received, becomes greater than a value obtained by dividing a scanning distance (Wm) of the laser beam in the main scanning direction on the light-receiving surface of the synchronization sensor (108) by a response delay time (Td) of the synchronization sensor (108).

These and other objects, features and advantages of the present invention will become apparent upon reading of the following detailed description along with the accompanied drawings.

DETAILED DESCRIPTION OF THE PREFERRED EMBODIMENTS

Figure 1:
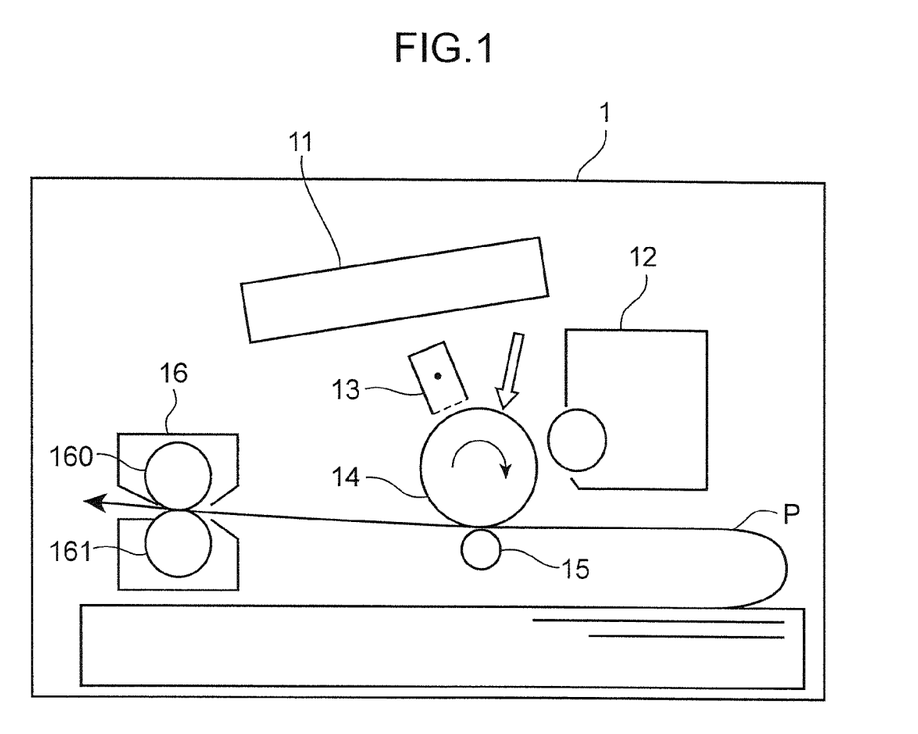
FIG. 1 is a cross section showing an example of the mechanical configuration of the printer as the image forming apparatus according to an embodiment of the present invention.

An embodiment of the image forming apparatus according to the present invention is now explained with reference to the appended drawings. As shown in FIG. 1, the printer 1 is configured by comprising a laser scanner 11, a developer 12, a charger 13, a photosensitive drum 14, a transfer roller 15 and a fixing unit 16.

The photosensitive drum 14 as the photosensitive body of the present invention is a cylindrical member, and is rotated in the clockwise direction shown in FIG. 1 by receiving the driving force from a motor not shown. The charger 13 uniformly charges the surface of the photosensitive drum 14.

The laser scanner 11 as the optical scanning device of the present invention comprises a light source such as a laser diode, and irradiates optical signals according to image data on the surface of the photosensitive drum 14 uniformly charged by the charger 13, and thereby forms an electrostatic latent image of the image data.

Note that the image data is data that is sent from a PC (personal computer) or the like connected to the printer 1, and received by the printer 1. Moreover, details concerning the laser scanner 11 will be described later with reference to FIG. 2.

The developer 12 comprises a toner container for housing the toner, and forms a toner image by supplying the toner on the surface of the photosensitive drum 14 on which the electrostatic latent image was formed. The toner image that is formed on the photosensitive drum 14 is transferred to recording paper to be transported along the transport path P or a transfer belt (not shown) by a transfer roller 15 described later.

A transfer roller 15 is disposed at a position that opposes the photosensitive drum 14. The transfer roller 15 is configured from a conductive rubber material or the like, and transfers the toner image that is formed on the photosensitive drum 14 to the recording paper to be transported along the transport path P, or the transfer belt.

The fixing unit 16 comprises a fixing roller 160 with a built-in heater or the like, and a pressure roller 161 provided at a position that opposes the fixing roller 160, and fixes the toner image formed on the recording paper by heating and transporting the recording paper on which the toner image was formed.

The image forming operation of the printer 1 is now briefly explained. Foremost, the surface of the photosensitive drum 14 is charged substantially uniformly by the charger 13. The charged surface of the photosensitive drum 14 is exposed by the laser scanner 11, and the electrostatic latent image of the image to be formed on the recording paper is formed on the surface of the photosensitive drum 14. This electrostatic latent image is formed into an image by causing the toner to become affixed on the surface of the photosensitive drum 14 by the developer 12, and the toner image on the surface of the photosensitive drum 14 is transferred to the recording paper by the transfer roller 15. After this operation is performed, the toner image transferred to the recording paper is fixed by the fixing unit 16.

Figure 2:
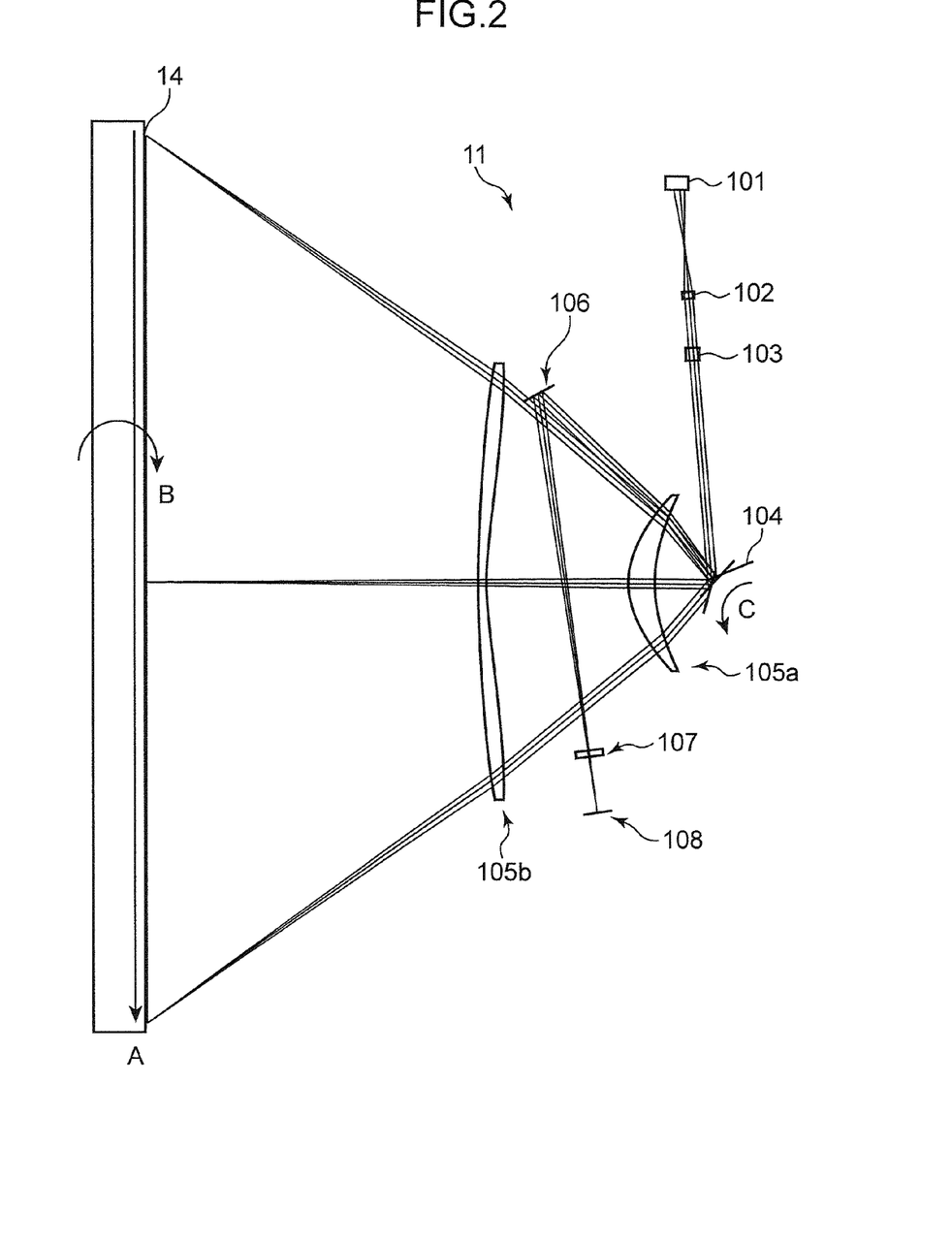
FIG. 2 is a configuration diagram showing an example of the mechanical configuration of the laser scanner.

As shown in FIG. 2, the laser scanner 11 is configured by comprising a semiconductor laser 101, a collimator lens 102 and a diaphragm 103 as the light source unit of the present invention, a polygon mirror 104 and scanning lenses 105a, 105b (when collectively designating the scanning lenses 105a, 105b, these will be hereinafter referred to as the "scanning lens group 105") as the deflector of the present invention, a reflective mirror 106 as the reflector of the present invention, a cylinder lens 107 as the condenser lens of the present invention, and a BD (Beam Detect) sensor 108 as the synchronization sensor of the present invention.

The semiconductor laser 101 emits a laser beam of a predetermined wavelength. The collimator lens 102 and the diaphragm 103 jointly cause the laser beam emitted from the semiconductor laser 101 to become parallel light. The polygon mirror 104 comprises, on its peripheral surface, a plurality of mirrors that reflect the laser beam that fell incident via the collimator lens 102 and the diaphragm 103, and is configured to rotate in the arrow direction (arrow C) of the diagram at a uniform velocity based on the driving force that is supplied by a polygon motor described later. In the respective mirrors, the laser beam that fell incident pursuant to the rotation of the mirrors becomes a polarizing beam that sequentially changes the angle, and is reflected toward the photosensitive drum 14.

The scanning lens group 105 condenses the laser beam that become a polarizing beam as a result of being reflected by the polygon mirror 104, and the scanning lens 105a and the scanning lens 105b jointly cause it to horizontally scan the photosensitive drum 14 horizontally in the main scanning direction (A direction in the diagram) at a uniform velocity.

The reflective mirror 106 comprises, on its surface, a reflective surface having a so-called anamorphic aspherical surface which is an arc-like curved surface in which the degree of concavity increases as it heads from the ends to the center of the main scanning direction, and reflects, toward the BD sensor 108, the laser beam deflected toward the outside of the photosensitive drum 14 among the laser beams that have passed through the scanning lens 105a. Note that the configuration of the reflective mirror 106 will be described in detail later.

The cylinder lens 107 condenses the laser beam reflected by the reflective mirror 106 in a sub scanning direction (B direction in the diagram) which is orthogonal to the main scanning direction (A direction in the diagram) for scanning the surface of the photosensitive drum 14, and outputs this toward the BD sensor 108 (synchronization sensor).

The BD sensor 108 is used for synchronizing the output timing of the laser beam from the semiconductor laser 101, which is the timing of starting the horizontal scanning of the photosensitive drum 14 using the laser beam, and the rotation of the polygon mirror 104.

Specifically, the BD sensor 108 receives the laser beam reflected by the polygon mirror 104, via the reflective mirror 106 and the cylinder lens 107, and outputs a detection signal representing the reception of the laser beam at the time that an electric charge corresponding to the amount of light of the received laser beam is accumulated a predetermined amount. The detection signal output by the BD sensor 108 is used for synchronizing the rotation of the polygon mirror 104 and the write timing of the image data; that is, the writing in the arrow A direction.

Note that the BD sensor 108 requires a predetermined time known as a response delay time that is unique to the sensor for performing the photoelectric conversion processing of accumulating an electric charge corresponding to the amount of light of the received laser beam, and is characterized in that it is unable to output the foregoing detection signal from the start of reception of the laser beam during the foregoing predetermined time.

Figure 3:
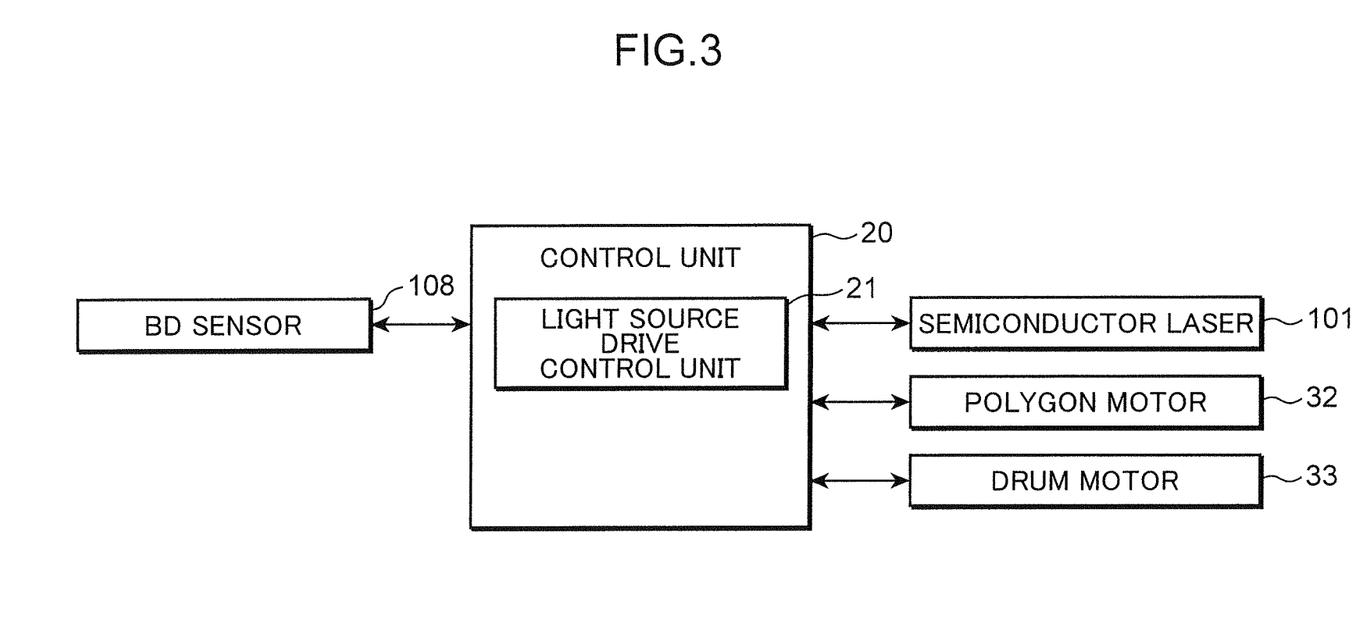
FIG. 3 is a block diagram showing the electrical configuration of the printer.

Moreover, as shown in FIG. 3, the printer 1 comprises a control unit 20 which governs the control of the overall printer 1.

The control unit 20 comprises a CPU, a ROM which stores operation programs of the overall device such as the control program for controlling the image forming operation, a RAM which temporarily stores image data and the like and which also functions as a work area, and memories such as a non-volatile memory or a hard disk drive (HDD) which stores the setting values of various control parameters, and the control of the overall device is performed as a result of the CPU executing the operation programs stored in the ROM.

The control unit 20 is connected to the BD sensor 108, the semiconductor laser 101, a polygon motor 32 as the drive source of the polygon mirror 104, and a drum motor 33 as the drive source of the photosensitive drum 14, and further comprises an interface circuit not shown which inputs and outputs detection signals that are output from the BD sensor 108, and control signals for controlling the drive of the semiconductor laser 101, the polygon motor 32 and the drum motor 33.

Moreover, the control unit 20 functions as the light source drive control unit 21, and the light source drive control unit 21 outputs to the semiconductor laser 101, while rotating the polygon mirror 104 at a predetermined rotation speed, the laser beam according to the image data of the latent image to be formed on the surface of the photosensitive drum 14 at a predetermined output timing that is synchronous with the foregoing rotation, and uses the detection signal of the photodiode provided inside the semiconductor laser 101 to control the amount of emission of the laser diode (Automatic Power Control; hereinafter referred to as "APC").

Accordingly, under the control of the light source drive control unit 21, the photosensitive drum 14 is horizontally scanned (exposed) for one line worth in the main scanning direction (A direction in FIG. 2) of the image data. In addition, under the control of the control unit 20, the photosensitive drum 14 is rotated one line worth in the sub scanning direction (B direction in FIG. 2), and the exposure of one line in the main scanning direction of the subsequent image data is performed.

Note that the laser scanner 11 is not limited to the foregoing configuration, and it can also be configured so that, for example, it comprises a plurality of semiconductor lasers 101, and outputs the laser beam from such plurality of semiconductor lasers 101 in parallel with the sub scanning direction, and simultaneously exposes a plurality of lines in the main scanning direction in parallel.

Figure 4:
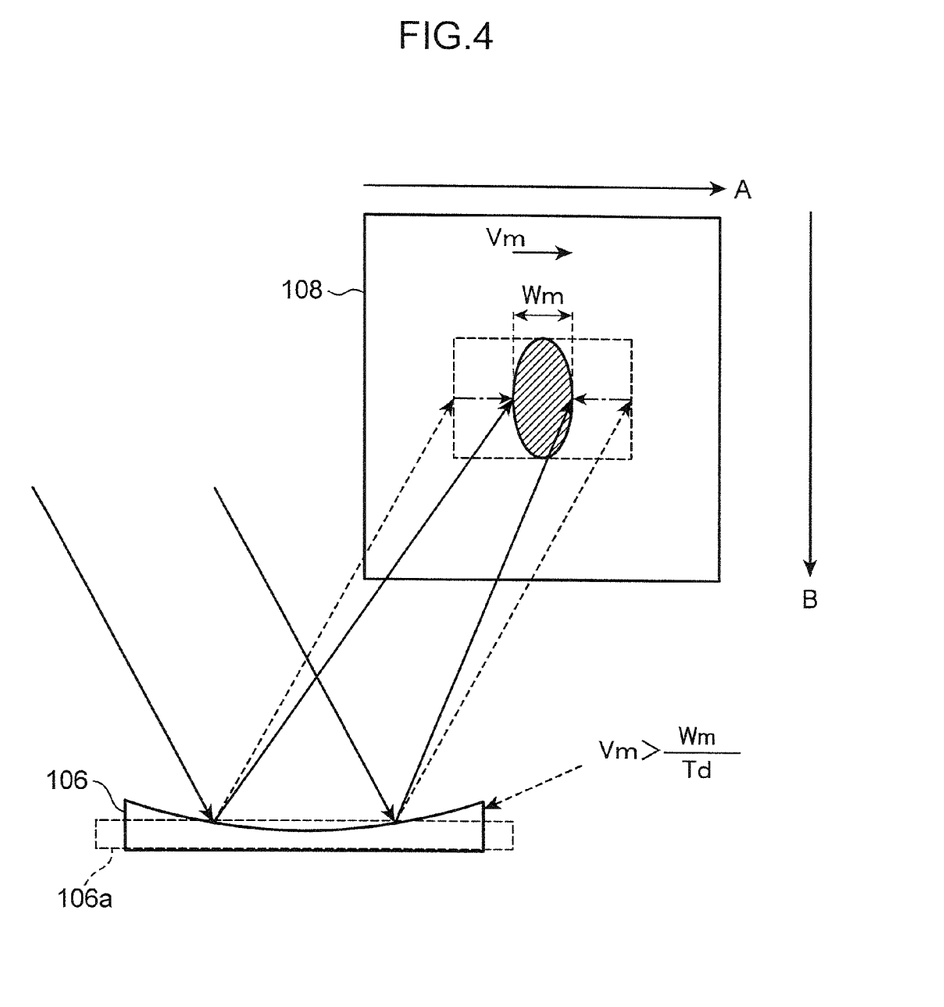
FIG. 4 is an explanatory diagram showing an example of the laser beam reflected by the reflector being received by the synchronization sensor.

The configuration of the reflective mirror 106 is now explained. The reflective mirror 106 as the reflector of the present invention comprises on its surface, for example, as shown in FIG. 4, a reflective surface having a so-called anamorphic aspherical surface which is an arc-like curved surface in which the degree of concavity increases as it heads from the ends to the center of the main scanning direction, and reflects, toward the solid line arrow direction, the laser beam deflected toward the outside of the photosensitive drum 14 among the laser beams that have passed through the scanning lens 105a, and causes it to enter the shaded oval area on the light-receiving surface of the synchronization sensor 108. Meanwhile, as shown with the dotted-line rectangle in the diagram, when a reflective mirror 106a having a flat reflective surface is disposed, the laser beam that has passed through the scanning lens 105a is reflected toward the dotted-line arrow direction, and enters the dotted-line rectangle area on the light-receiving surface of the synchronization sensor 108.

In other words, the reflective mirror 106 has the function of focusing the scanning of the laser beam reflected by the reflective surface, on the light-receiving surface of the synchronization sensor 108 to the main scanning direction (dashed-line arrow direction in the diagram). Note that this function is adjusted by the configuration of the reflective mirror 106; for instance, the adjustment of the degree of concavity of the reflective surface of the reflective mirror 106, or the arrangement of the reflective mirror 106.

Specifically, the reflective mirror 106 is set so that a scanning speed Vm in a main scanning direction, which is a scanning direction of the laser beam on a light-receiving surface of the BD sensor 108, of the laser beam reflected by the reflecting surface becomes greater than a value obtained by dividing a scanning distance Wm of the laser beam in the main scanning direction on the light-receiving surface of the BD sensor 108 by a response delay time of the BD sensor 108. This setting includes the setting of the degree of curvature of the reflective mirror 106 and the setting of the arrangement of the reflective mirror 106 relative to the BD sensor 108.

Note that the scanning speed Vm in the main scanning direction on the light-receiving surface of the BD sensor 108 is calculated as a value f×θ/t obtained by dividing, by the time t required for the deflector 104 to rotate a rotation angle θ of the deflector 104, a result of multiplying the rotation angle θ by a focal length f in a main scanning direction of a ray path in which the laser beam reflected by a mirror of the deflector 104 reaches the BD sensor 108.

Figure 5A:
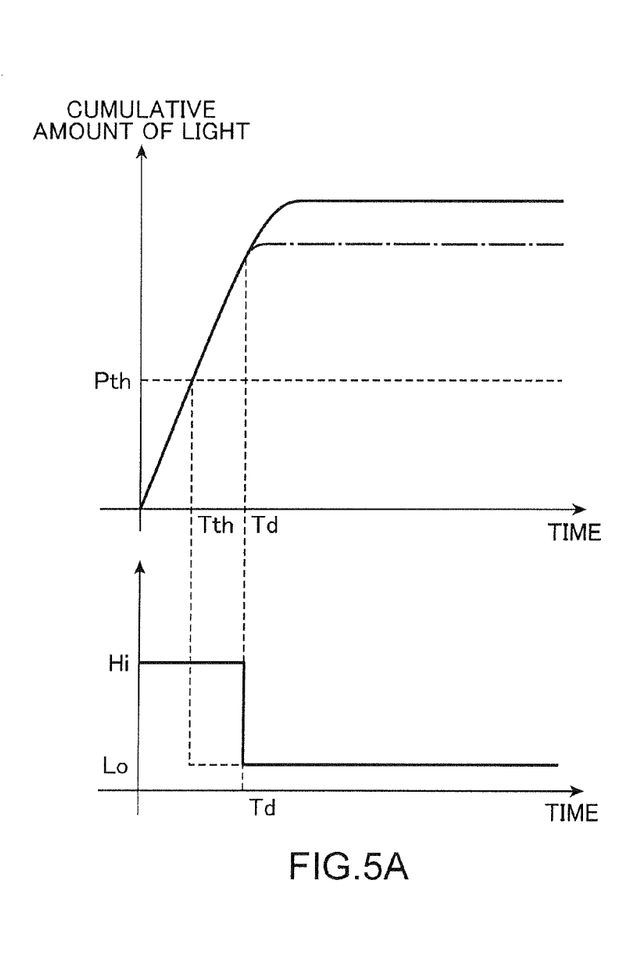
FIG. 5 is an explanatory diagram explaining an example of the relationship among the cumulative amount of light of the laser beam received by the synchronization sensor, the detection signal that is output from the synchronization sensor, and time.

Moreover, for instance, when the amount of light of the laser beam that entered the light-receiving surface is great as shown in FIG. 5A, the BD sensor 108 outputs a detection signal Lo representing the reception of the laser beam after the lapse of the response delay time Td even in cases where an electric charge corresponding to the amount of light of the received laser beam has been accumulated a predetermined amount Pth at the point of the time Tth. In other words, as shown with the solid line part and the dashed line part in the diagram, when the amount of light of the laser beam that entered the light-receiving surface is great, there will no difference in the output timing of the detection signal even if the amount of light changes so as long as the amount of light is exceeding the predetermined amount Pth at the point of the response delay time Td.

Figure 5B:
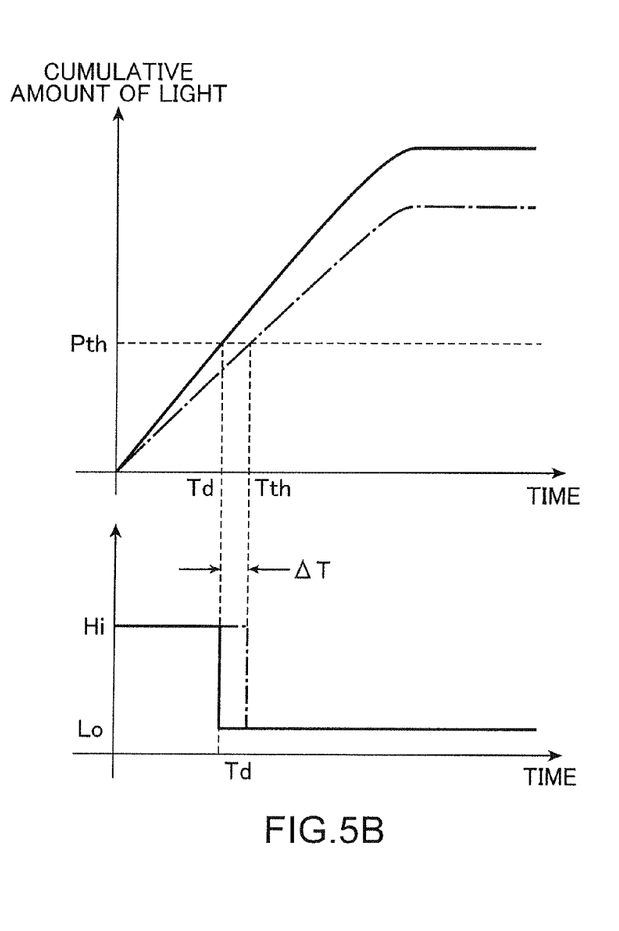

Nevertheless, for instance, when the amount of light of the laser beam that entered the light-receiving surface is small as shown in FIG. 5B, the BD sensor 108 outputs a detection signal Lo representing the reception of the laser beam at the point when an electric charge corresponding to the amount of light of the received laser beam at the time Tth has been accumulated a predetermined amount Pth. In other words, as shown with the solid line part and the dashed line part in the diagram, when the amount of light of the laser beam that entered the light-receiving surface is small, a difference ΔT will arise in the output timing of the detection signal pursuant to the change in the amount of light.

Thus, according to the present configuration, since the scanning speed Vm in a main scanning direction, which is a scanning direction of the laser beam on a light-receiving surface of the BD sensor 108, of the laser beam reflected by the reflecting surface is set to be greater than a value obtained by dividing a scanning distance Wm of the laser beam in the main scanning direction on the light-receiving surface of the BD sensor 108 by a response delay time of the BD sensor 108, the BD sensor 108 outputs a detection signal representing that the entrance of the laser beam reflected by the reflective surface to the BD sensor 108 was completed within the response delay time Td, and an electric charge corresponding to the amount of light of the incident laser beam was accumulated a predetermined amount at the point that the response delay time Td had lapsed.

Thus, for example, since a detection signal is output from the BD sensor 108 at the point that the response delay time Td had lapsed even in cases where the amount of light of the laser beam reflected by the reflective mirror 106 changes due to the contamination of the mirror on the peripheral surface of the polygon mirror 104 or changes in the amount of light caused by the semiconductor laser 101, there will no longer be any variation in the output timing of the detection signal of the BD sensor 108, and it is thereby possible to accurately obtain a synchronization signal for adjusting the write start timing of writing on the photosensitive drum 14.

Figure 6:
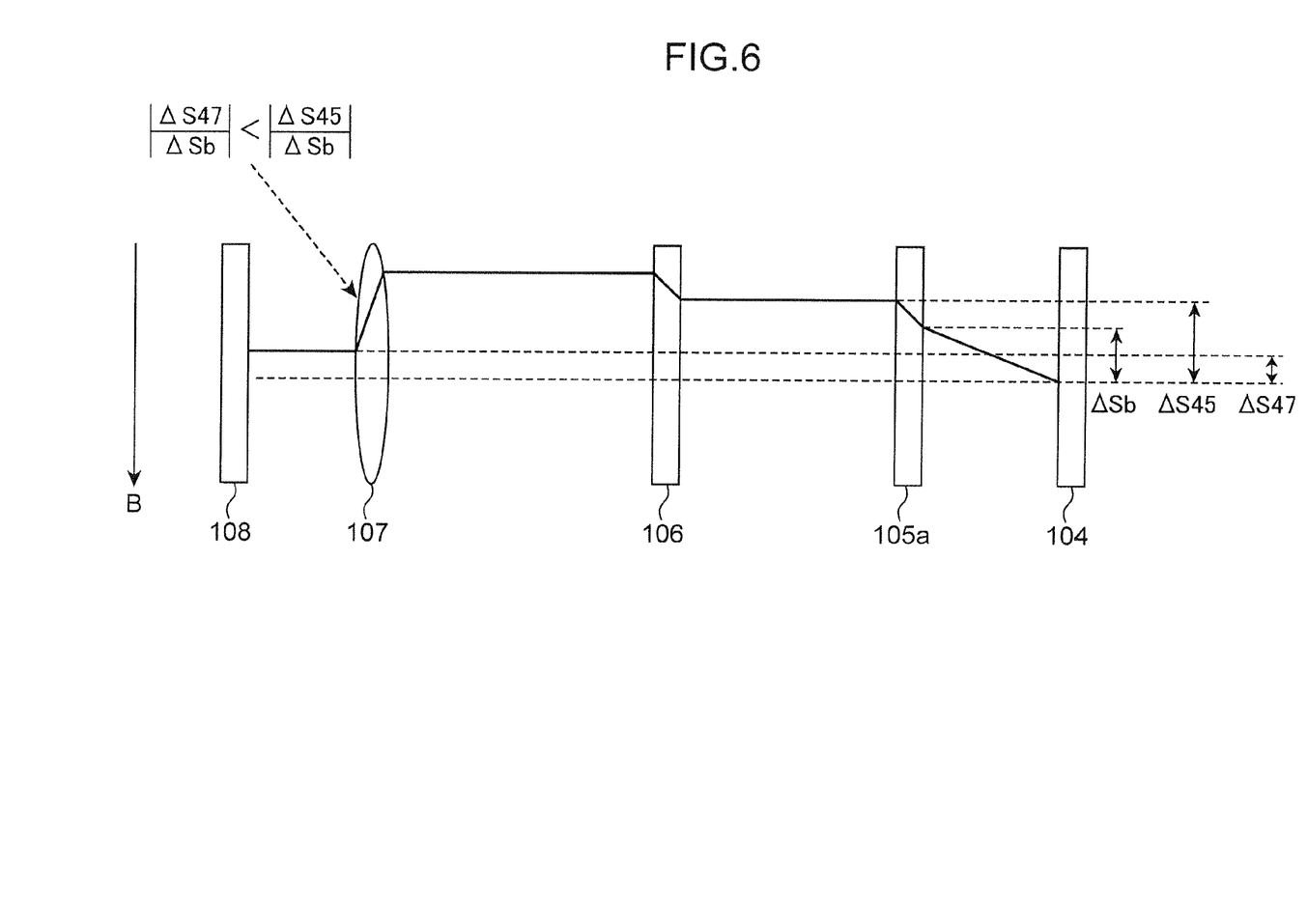
FIG. 6 is an explanatory diagram showing a mode of the laser beam being shifted in the sub scanning direction from the time it is reflected by the deflector and received by the synchronization sensor.

Note that, for example, as shown in FIG. 6, the cylinder lens 107 can also be configured to condense the laser beam in the sub scanning direction so that, when the laser beam reflected by the polygon mirror 104 enters the scanning lens 105a by being shifted by a predetermined shift length ΔSb in the sub scanning direction, a first sub scanning magnification rate which is a result of dividing, by the predetermined shift length ΔSb, a shift length ΔS47 in the sub scanning direction obtained when the laser beam having entered the scanning lens 105a enters the light-receiving surface of the BD sensor 108 via the scanning lens 105a, the reflector 106 and the cylinder lens 107, becomes smaller than a second sub scanning magnification rate which is a result of dividing, by the predetermined shift length ΔSb, a shift length ΔS45 in the sub scanning direction obtained when the laser beam having entered the scanning lens 105a is output from the scanning lens 105a.

In the foregoing case, even in cases where the laser beam reflected by the polygon mirror 104 varies by the predetermined shift length ΔSb in the sub scanning direction, and such laser beam varies in the sub scanning direction in the amount of the shift length ΔS45 corresponding to the multiple of the second sub scanning magnification rate of the predetermined shift length ΔSb as a result of going through the scanning lens 105a, the variation of the laser beam in the sub scanning direction will be diminished to the shift length ΔS47 corresponding to the multiple of the first sub scanning magnification rate of the predetermined shift length ΔSb when the laser beam is reflected by the reflective mirror 106 and enters the light-receiving surface of the BD sensor 108 via the cylinder lens 107.

In other words, even in cases where the laser beam that entered the polygon mirror 104 is reflected by varying in the amount of the predetermined shift length ΔSb in the sub scanning direction, the variation of the laser beam in the sub scanning direction to enter the BD sensor 108 will be diminished more than the variation of the laser beam in the sub scanning direction to enter the reflective mirror 106. Thus, according to the present configuration, it is possible to reduce the trouble of inclining and adjusting the reflective mirror 106 and the BD sensor 108 in the sub scanning direction in preparation for a case where the laser beam that entered the polygon mirror 104 is reflected by varying in the sub scanning direction.

Note that the present invention is not limited to the configuration of the foregoing embodiment and can be variously modified. For example, the laser scanner 11 can be configured simply without providing the foregoing cylinder lens 107. Moreover, although the foregoing embodiment explained the image forming apparatus of the present invention as the printer 1 for forming black-and-white images, the image forming apparatus of the present invention is not limited thereto, and it can also be a color printer for forming color images, or a multi-functional device comprising a scanner function, a facsimile function, a printer function, a copy function and the like.

Moreover, the configuration and settings shown in FIG. 1 to FIG. 6 in the foregoing embodiment are merely examples, and are not intended to limit the present invention to the embodiment.

This application is based on Japanese Patent Application Serial No. 2010-266805 filed in Japan Patent Office on Nov. 30, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical scanning device, comprising:
 a light source unit which emits a laser beam;
 a deflector which reflects and deflects the laser beam emitted from the light source unit;
 a scanning lens which causes the laser beam deflected by the deflector to scan a surface of a photosensitive body at a uniform velocity;
 a reflector having, on its surface, a reflective surface which reflects the laser beam deflected toward the outside of the photosensitive body among the laser beams that have passed through the scanning lens; and
 a synchronization sensor with a light receiving surface that receives the laser beam reflected by the reflector and outputs a detection signal representing the reception of the laser beam, the synchronization sensor outputting the detection signal after a lapse of a response delay time, starting from reception of the laser beam, the response delay time being unique to the synchronization sensor and corresponding to a predetermined amount of light of the received laser beam being accumulated;
 wherein the reflective surface of the reflector has an optical power to reduce a scanning distance of the laser beam on the light-receiving surface of the synchronization sensor in a main scanning direction, which is a scanning direction of the laser beam on the light-receiving surface of the synchronization sensor, and wherein the optical power is selected to reduce the scanning distance of the laser beam sufficiently for a scanning speed of the laser beam in the main scanning direction to become greater than a value obtained by dividing the scanning distance by the response delay time of the synchronization sensor in order to complete, within the response delay time, entrance of the laser beam reflected by the reflective surface to the synchronization sensor.

2. The optical scanning device according to claim 1, further comprising:
 a condenser lens through which the laser beam reflected by the reflector enters, and which condenses the incident laser beam in a sub scanning direction that is orthogonal to the main scanning direction and outputs this condensed laser beam toward the synchronization sensor,
 wherein the condenser lens condenses the laser beam in the sub scanning direction in such a manner that a first sub scanning magnification rate becomes smaller than a second sub magnification rate,
 where
 said first sub scanning magnification rate is a value obtained, when the laser beam reflected by the deflector enters the scanning lens by being shifted by a predetermined shift length in the sub scanning direction, from dividing a shift length in the sub scanning direction obtained when the laser beam having entered the scanning lens enters the light-receiving surface of the synchronization sensor via the scanning lens, the reflector and the condenser lens by the predetermined shift length, and
 said second sub scanning magnification rate is a value obtained, when the laser beam reflected by the deflector enters the scanning lens by being shifted by said predetermined shift length in the sub scanning direction, from dividing a shift length in the sub scanning direction obtained when the laser beam having entered the scanning lens is output from the scanning lens by the predetermined shift length.

3. An image forming apparatus comprising the optical scanning device according to claim 2.

4. The optical scanning device according to claim 1, wherein the scanning speed in the main scanning direction on the light-receiving surface of the synchronization sensor is calculated as a value (f×θ/t) obtained by dividing a result of multiplying the rotation angle θ by a focal length f in a main scanning direction of a ray path in which the laser beam reflected by a mirror of the deflector reaches the synchronization sensor by the time t required for the deflector to rotate a rotation angle θ of the deflector.

5. The optical scanning device according to claim 4, wherein the scanning distance (Wm) is a MAX travel distance, in the main scanning direction, of the laser beam which is received by the light-receiving surface of the synchronization sensor, and the response delay time (Td) is a pre-set delay time.

6. An image forming apparatus comprising the optical scanning device according to claim 5.

7. An image forming apparatus comprising the optical scanning device according to claim 4.

8. An image forming apparatus comprising the optical scanning device according to claim 1.

9. The optical scanning device according to claim 1, wherein
the reflective surface of the reflector is a concave surface that has the function of reducing the scanning distance, the concave surface defining an arc where the degree of concavity increases from ends thereof toward a center in the main scanning direction.

* * * * *